United States Patent [19]
Drori

[11] Patent Number: 5,176,829
[45] Date of Patent: Jan. 5, 1993

[54] COOPERATING FILTER DISK UNITS WITH FINGERED SURFACES

[76] Inventor: Mordeki Drori, POB 21538, Tel Aviv, Israel

[21] Appl. No.: 462,616

[22] Filed: Jan. 9, 1990

[30] Foreign Application Priority Data

Jan. 12, 1989 [IL] Israel .................................. 88939

[51] Int. Cl.⁵ ............................................ B01D 29/46
[52] U.S. Cl. .................................. 210/346; 210/486; 210/488
[58] Field of Search .............. 210/346, 486, 488, 489, 210/315

[56] References Cited

U.S. PATENT DOCUMENTS

| | | | |
|---|---|---|---|
| 1,926,557 | 9/1933 | Perkins | 210/167 |
| 4,683,060 | 7/1987 | Drori | 210/448 |
| 4,744,901 | 5/1988 | Drori | 210/323.1 |
| 4,751,000 | 6/1988 | Drori | 210/448 |
| 4,844,806 | 7/1989 | Drori | 210/448 |
| 4,880,537 | 11/1989 | Drori | 210/488 |
| 4,935,126 | 6/1990 | Drori | 210/136 |
| 4,966,702 | 10/1990 | Drori | 210/488 |
| 4,978,450 | 12/1990 | Drori | 210/488 |

Primary Examiner—Robert A. Dawson
Assistant Examiner—W. L. Millard
Attorney, Agent, or Firm—Renner, Otto, Boisselle & Sklar

[57] ABSTRACT

A disk-type filter comprising a housing having an inlet connectable to an upstream pipe and an outlet connectable to a downstream pipe and a stack of filter units disposed within the housing for separating solid particles from a fluid flowing between filter units in the stack of filter units from an upstream side of the stack of filter units to a downstream side thereof, characterized in that the stack of filter units includes a plurality of co-operating filter units defining a plurality of paired co-operating filter surfaces, including first and second surfaces each defining a plurality of fingers, the fingers defined by the first surface being arranged in registration with the fingers defined by the second surface, the exteriors of the fingers defined by the first and second surfaces communicating with either one of an upstream side and a downstream side and the interiors of the fingers communicating with the other one of the upstream side or downstream side, spaces being defined in association with the fingers defined by the first and second surfaces and being disposed in registration so as to define channels, which permit particulate matter to become disengaged with the upstream side of the fingers defined by the first and second surfaces, the fingers of each disk being joined.

22 Claims, 3 Drawing Sheets

COOPERATING FILTER DISK UNITS WITH FINGERED SURFACES

FIELD OF THE INVENTION

The present invention relates generally to filter apparatus and systems and more particularly to filters comprising a plurality of disc elements.

BACKGROUND OF THE INVENTION

A wide variety of filters are known for filtering water and similar fluids. In particular, filter apparatus comprising a plurality of disc elements are known. Filters of this type are described and claimed, for example, in applicant's U.S. patent applications Ser. Nos. 647,094, filed Sep. 4, 1984, now U.S. Pat. No. 4,624,785; 709,371, filed Mar. 7, 1985, now abandoned; 709,372, filed Mar. 7, 1985, now U.S. Pat. No. 4,683,060; 709,373, filed Mar. 7, 1985, now U.S. Pat. No. 4,654,143; and U.S. Pat. Nos. 4,026,806; 4,042,504; 4,045,345; 4,271,018; 4,278,540; 4,295,963.

There is disclosed in Published European Application 0284729 of Applicant, multiple-disc filter apparatus including high performance filter discs. Particular emphasis is placed on the flexibility of individual finger portions of the filter disks.

SUMMARY OF THE INVENTION

The present invention seeks to provide an improved filter for use in filtering fluids, such as water.

There is thus provided in accordance with a preferred embodiment of the present invention, a disk-type filter comprising a housing having an inlet connectable to an upstream pipe and an outlet connectable to a downstream pipe and a stack of filter units disposed within the housing for separating solid particles from a fluid flowing between filter units in the stack of filter units from an upstream side of the stack of filter units to a downstream side thereof, characterized in that the stack of filter units includes a plurality of co-operating filter units defining a plurality of paired co-operating filter surfaces, including first and second surfaces each defining a plurality of fingers, the fingers defined by the first surface being arranged in registration with the fingers defined by the second surface, the exteriors of the fingers defined by the first and second surfaces communicating with either one of an upstream side and a downstream side and the interiors of the fingers communicating with the other one of the upstream side or downstream side, spaces being defined in association with the fingers defined by the first and second surfaces and being disposed in registration so as to define channels, which permit particulate matter to become disengaged with the upstream side of the fingers defined by the first and second surfaces, the fingers of each disk being joined.

Preferably, the fingers of each disk are joined by an external ring.

According to a further preferred embodiment of the present invention, there is provided a filter unit comprising first and second surfaces defining a plurality of fingers, the fingers being joined by an external ring and spaces being defined in association with the fingers such that when a plurality of filter units are disposed in registration, the spaces define channels, and the external rings define an upstream filtering barrier.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figure 1:
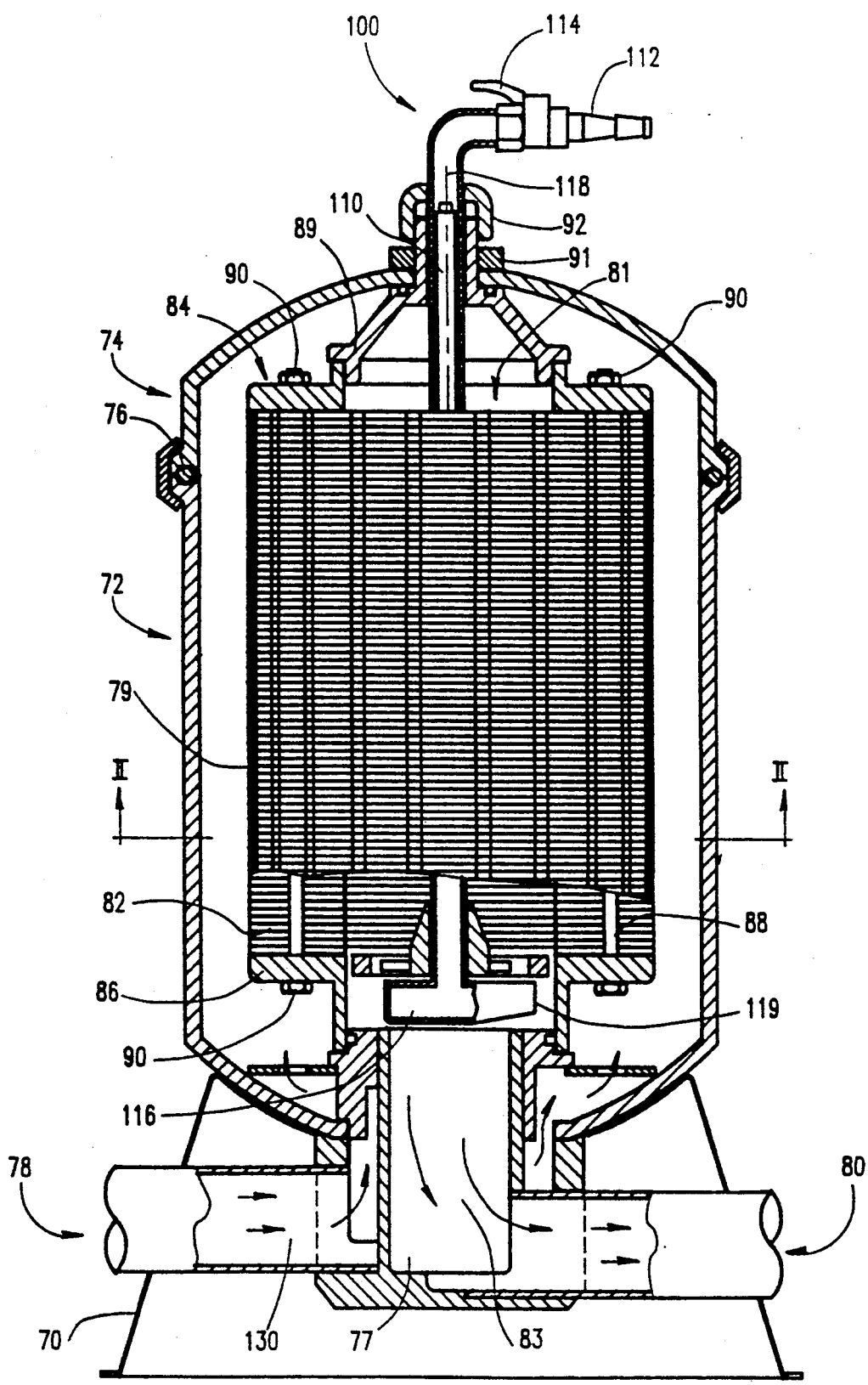
FIG. 1 is a partially cut-away side view sectional illustration of a filter constructed and operative in accordance with a preferred embodiment of the present invention.
Figure 2:
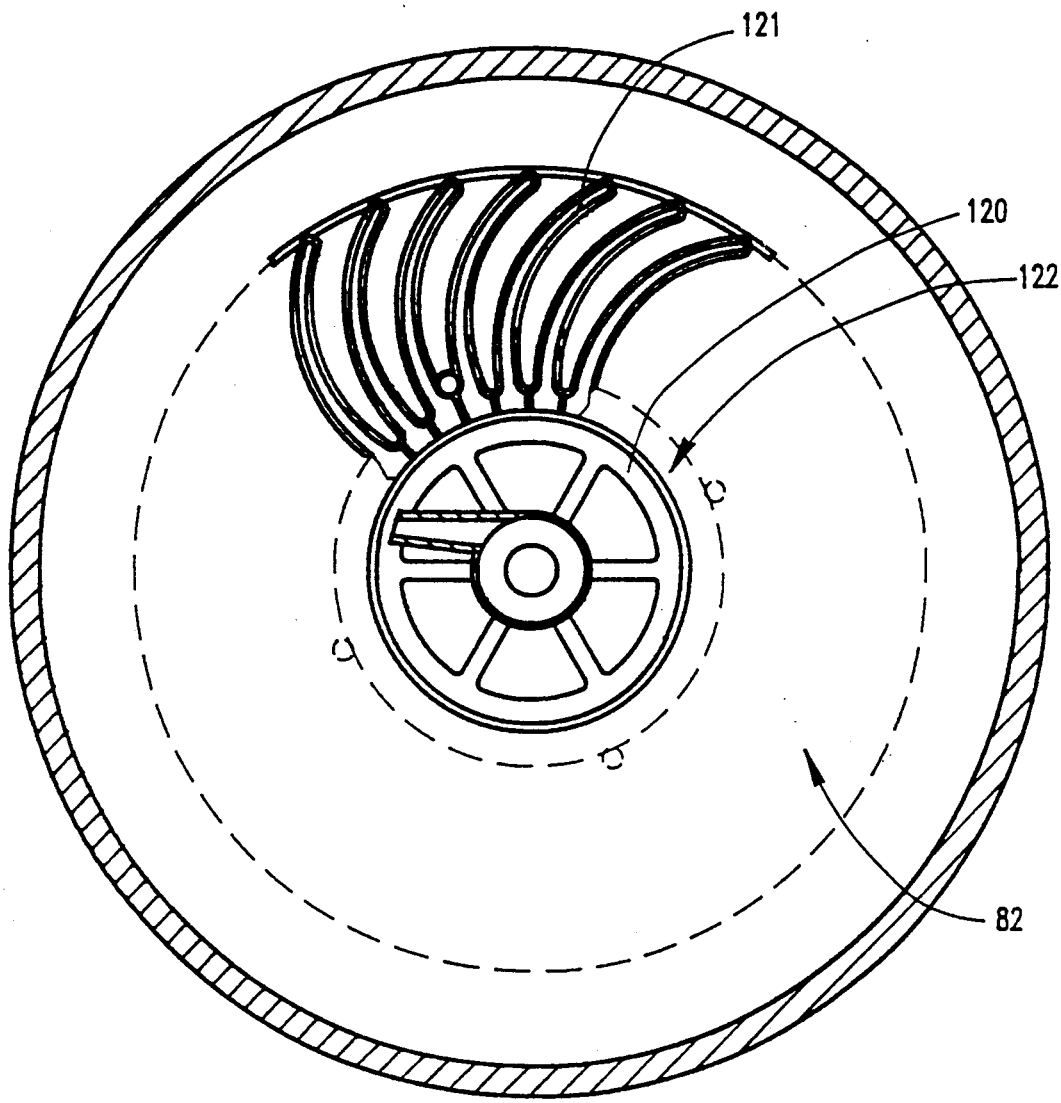
FIG. 2 is a sectional illustration taken along the lines II—II of FIG. 1.
Figure 3:
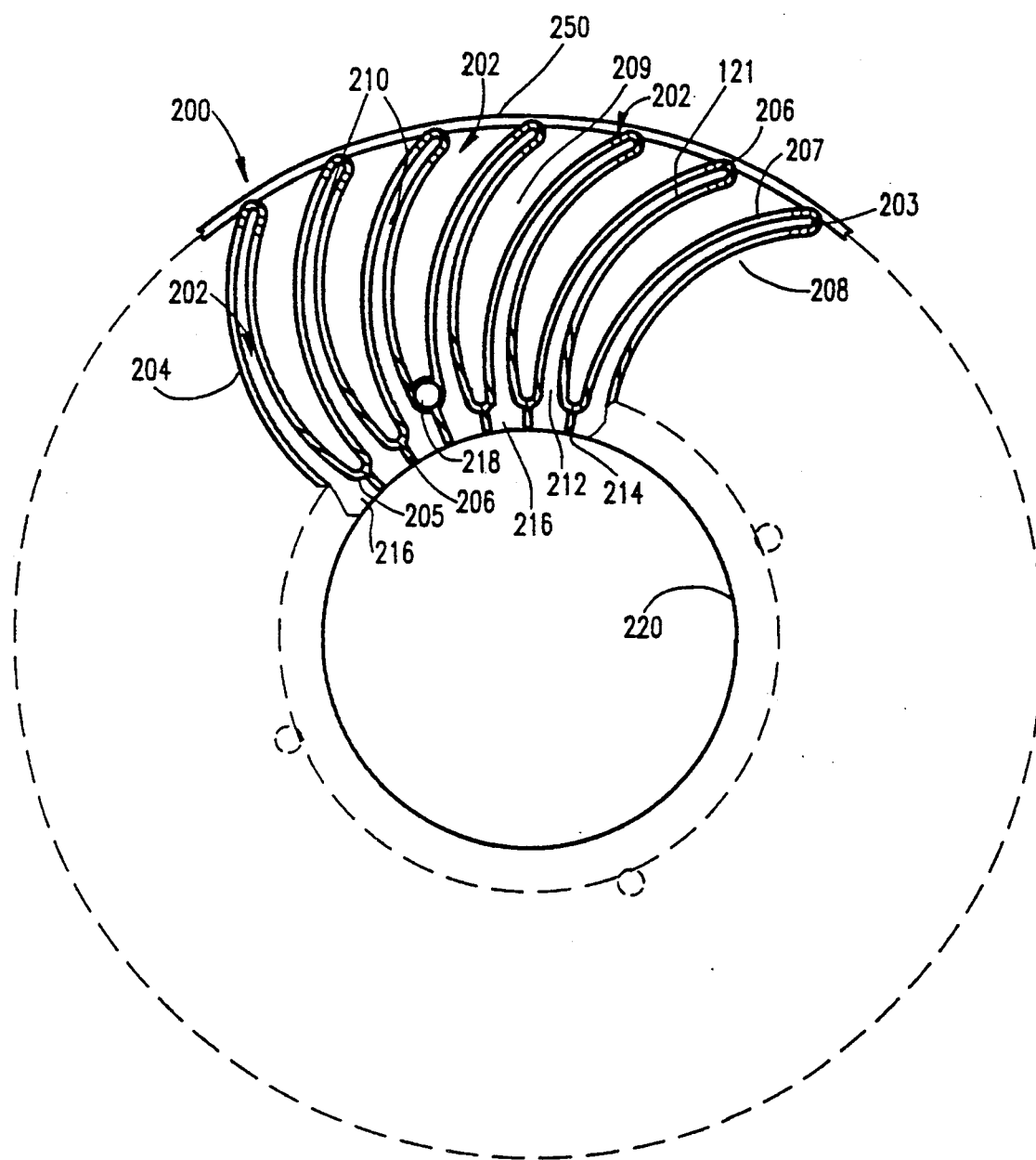
FIG. 3 is a planar view illustration of a filter disk constructed and operative in accordance with a preferred embodiment of the invention for use in the apparatus of FIG. 1.

Reference is now made to FIGS. 1, 2 and 3 which illustrate a filter constructed and operative in accordance with a preferred embodiment of the present invention and comprising a base 70 on which is fixedly supported a bottom housing portion 72. Removably mounted onto the bottom housing portion 72 is a top housing portion 74, which is maintained in sealing engagement therewith by means of a sealing ring 76.

A fluid inlet 78 is provided in spaced relationship with the bottom of housing portion 72 and is coupled to a manifold 77. Inlet 78 communicates through manifold 77 with the outside cylindrical surface, hereinafter termed the "upstream surface", of a stack of filter elements 79. A fluid outlet assembly 80 communicates via a conduit 83 disposed interiorly of manifold 77 with a hollow interior portion 81 of stack of filter elements 79. Volume 81 is defined by the inner cylindrical surface of the stack of filter elements, hereinafter termed the "downstream surface".

The stack of filter elements 79 preferably comprises a stack of hollow center filter disks 82 of the type illustrated in FIG. 3.

Filter disks 82 are preferably removably mounted in coaxial relationship so as to define volume 81 and are retained in suitably tight mutual engagement by means of top and bottom retaining collars 84 and 86 joined by a plurality of threaded rods 88, typically four in number, and associated nuts 90. A retaining member 89 supports top retaining collar 84 and is sealingly mounted onto the top housing portion 74 by a threaded retaining ring 91. A collar member 92 engages retaining member 89.

A focussed jet nozzle assembly 100 is disposed mainly within volume 81 and comprises a water supply shaft 110 having a water inlet 112 and an associated inlet valve 114.

A rotatable focussed jet outlet head 116 is arranged for relatively free rotation about a rotation axis 118 defined in shaft 110 and is provided with a single output aperture 119. Referring now to FIG. 2, it is seen that the outlet aperture is arranged to provide an eccentric water output jet which drives the outlet aperture 119 in rotary motion about axis 118, thus sequentially directing the output jet into each of a multiplicity of azimuthally separated backflow chambers 121 defined by the adjacent filter disks 82.

There is preferably provided above outlet aperture 119 a positioning ring 120, curved to correspond to the curvature of the inner, downstream, surface 122 of the stack of filter elements, for desired positioning of the focussed jet nozzle assembly 100 in volume 81, whereby the axis of rotation of the focussed jet outlet head 116 is centered with respect to cylindrical downstream surface 122, such that the output aperture 119 is always at a predetermined distance from the downstream surface 122, so as not to interfere with the rotation of focussed jet outlet head 116.

It may be appreciated that the focussed water jet exiting from outlet aperture 119 is forced into the individual volumes defined by the stack of filter elements facing the outlet aperture, providing efficient flushing of the accumulated solid material, and is not permitted to be spread out, which would result in a reduction of its strength and its backflowing efficiency.

The outlet aperture 119 is displaced up and down and rotated about axis 118, and the pressurized stream produced thereby is sequentially concentrated on individual filtering chambers 121 defined in the stack of filter elements to provide enhanced backflowing thereof.

As noted above, outlet aperture 119 is arranged to provide a radially directed concentrated backflowing jet, which serves to flush particulate matter from the stack of filter elements 79.

During normal operation of the filter of the present invention, focussed jet nozzle assembly 100 is located partly within volume 81 and shaft 110 is sealingly coupled to the top portion 74 of the housing by means of sealing collar 92 which sealingly engages threading on retaining member 89. Liquid to be filtered passes to inlet 78 and through the stack of filter elements 79 from the upstream surface to the downstream surface, being filtered in the process. The filtered liquid passes through volume 81. Valve 114 is closed.

During backflow operation, valve 114 is opened to provide a pressurized flow of water to focussed jet nozzle assembly 100 and collar 92 is disconnected.

Focussed jet outlet head 116 is manually reciprocated axially along the interior of the stack of filter elements at the downstream surface and is rotated by the fluid stream eccentrically exiting therefrom through at least 360 degrees, causing a high pressure concentrated jet of water to enter the backflow chambers 121 from the downstream surface of the filter for dislodging accumulated filtered material from the upstream side of the stack of filter elements. This arrangement enables substantially all of the backflow chambers 121 to be thus scanned, region by region, by the concentrated jet for efficient backflow cleaning of the stack of filter elements.

In the embodiment of FIG. 1, the rods 88, which tightly secure the filter disks 82 together in stack 79, are disposed intermediate the inner and outer diameters of the stack. This arrangement of rods 88 eliminates interference with backflowing which would occur were the rods 88 located inwardly of the downstream surface of the stack 79 and also reduces the waste volume of the housing relative to the volume which would be required were the rods 88 to be located outwardly of the upstream surface. Thus, the embodiment of FIG. 1 maximizes the relationship between stack diameter and inner diameter of the housing.

The embodiment of FIG. 1 preferably is characterized in that it includes a stack of filter elements 79 of the type illustrated in FIG. 3.

Reference is now made to FIG. 3, which illustrates a preferred embodiment of filter element constructed and operative in accordance with a preferred embodiment of the invention. The filter element is appropriate for use in any suitable filter apparatus, and is particularly useful in the filter apparatus described hereinabove. FIG. 3 illustrates in plan view a portion of a filter disk 200 comprising a plurality of finger elements 202. Each finger element defines a tip thereof 203 and a base thereof 205.

It is seen that the configuration of the finger element 202 is preferably not exactly radial. Specifically, the outline of each finger element is defined by a line portion 204 which is curved along an arc. The arcs defined by the configurations of the plurality of finger elements are not concentric. The resulting configuration provides a relatively enhanced length of the line portion, and thus of the filter barrier per unit area of the filter element. It will be appreciated that the filter barrier defined by the raised line portion 204 defines a barrier between an upstream side of the filter, here typically the radially outward side of the line portion, and the downstream side of the filter, typically the radially inward side of the line portion. Accordingly, it may be understood that an increase in the length of the filter barrier per unit area of filter element provides a corresponding increase in the filtering capacity of the unit per unit area of filter element, and per unit volume of a filter assembly made up of a stack of such filter elements. The raised line portion 204 is preferably formed with an array of grooves 206.

The spaces 209 between adjacent finger elements 202, which typically lie at the upstream side of the filter, define filtering volumes, which may accommodate, according to a preferred embodiment of the invention, a filter cake.

Spaces 210, defined interiorly of each finger element 202, which typically lie at the downstream side of the filter, define planar dividers 212, which are recessed with respect to the line portions of both the first and the second surfaces, such that when a plurality of filter elements is arranged in registration in a stack, the planar dividers define a multiplicity of backflow chambers 121 for enhanced and concentrated backflowing. These backflow chambers are particularly suitable for pressurized backflow cleaning by the backflow focused jet produced by the apparatus of FIGS. 1-3 described hereinabove.

Preferably, the filter units 200 are formed of a plastic material, such as polypropylene. The filter elements comprise identically patterned opposite first and second planar surfaces. Except for grooves 206, the two planar surfaces of each filter element are mirror images of one another, such that the line portions on both first and second surfaces thereof are in registration, as are the spaces between fingers and the spaces inside fingers. The grooves 206 on each individual raised line portion 204 are preferably skewed with respect to the grooves on the raised line portion facing that individual raised line portion 204.

It may be appreciated that fluid, such as water, carrying particulate matter, enters from the upstream side, as indicated by arrows 130, and deposits the particulate matter upstream of the raised line portion.

It may additionally be appreciated that a filter aid such as diatomaceous earth, activated carbon or a filter cake may be employed and disposed at the upstream side of the stack of filter elements.

Additionally in accordance with a preferred embodiment of the present invention, radially inward of each of the finger base portions 205 there is provided a narrow, radially extending structural member 214, which extends nearly but not completely to the inner edge 220 of the disk 200. Structural members 214 provide structural support for the disk 200 while also functioning to define backflow chambers 216 between adjacent members 214. These backflow chambers 216 are relatively broad adjacent the downstream side of the stack for minimum interference with a jet of backflow fluid and then narrow as they extend between respective outwardly facing and inwardly facing line portions 207 and 208.

Additionally in accordance with a preferred embodiment of the present invention, and as noted above in connection with FIG. 1, accommodation is made for transversely extending rods 88, in the form of sockets 218 which are located intermediate the inner and outer diameters of the disk 200. According to a preferred embodiment of the invention, as illustrated in FIG. 12, the socket 218 is located in communication with the upstream side of the disk 200 and is disposed between adjacent base portions 205 so as to minimize interference with backflowing while also minimizing the loss of filter surface area at the socket.

In accordance with a preferred embodiment of the present invention, the fingers 202 are joined at a location radially outward from their base 205 in order principally to provide added structural strength to the filter stack. According to a preferred embodiment of the invention, the fingers 202 are joined by a peripheral ring 250 which lies at the periphery of the filter unit. Alternatively, the fingers 202 may be joined at a more interior location. However the fingers are joined, it is desired to minimize the blocking of the channels between the fingers 202.

In accordance with the preferred embodiment, illustrated in FIG. 3, wherein the fingers 202 are joined by an external peripheral ring 250, the filter stack defined by the filter units of the type illustrated in FIG. 3 has the added feature of the provision of an additional filter barrier, constituted by the peripheral rings 250 which are arranged in stacked orientation. This additional filter barrier preferably provides a relatively coarse filter which separates out relatively large particles.

It will be appreciated by persons skilled in the art that the present invention is not limited by what has been particularly shown and described hereinabove. Rather the scope of the invention is defined only by the claims which follow:

I claim:

1. A disk-type filter comprising:
   a housing having an inlet connectable to an upstream pipe and an outlet connectable to a downstream pipe; and
   a stack of filter units disposed within said housing for separating solid particles from a fluid flowing between filter units in said stack of filter units from an upstream side of said stack of filter units to a downstream side thereof,
   characterized in that said stack of filter units comprises a plurality of co-operating filter units defining a plurality of paired co-operating filter surfaces, comprising first and second surfaces each defining a plurality of fingers, said fingers defined by said first surface being arranged in registration with said fingers defined by said second surface, the exteriors of said fingers defined by said first and second surfaces communicating with either one of an upstream side and a downstream side and the interiors of said fingers defined by said first and second surfaces communicating with the other one of said upstream side or downstream side, spaces being defined in association with said fingers defined by said first and second surfaces and being disposed in registration so as to define channels, which permit particulate matter to become disengaged with said upstream side of said fingers defined by said first and second surfaces, the fingers of each unit being joined at a location radially outward of their base.

2. A filter according to claim 1 and wherein said fingers are joined peripherally thereof.

3. A filter according to claim 1 and wherein said fingers are joined by an external ring.

4. A filter according to claim 3 and wherein said external rings of said filter units when mutually coaxially disposed, jointly define a preliminary coarse filter barrier.

5. A filter unit comprising:
   first and second surfaces defining a plurality of fingers extending from a base, said plurality of fingers being joined at a location radially outward from said base and spaces being defined in association with said plurality of fingers defined by said first and second surfaces such that when a plurality of filter units are disposed in registration, said spaces define channels and said plurality of fingers define a coarse filtering barrier.

6. A filter unit according to claim 5 and wherein said fingers are joined peripherally thereof.

7. A filter according to claim 5 and wherein said fingers are joined by an external ring.

8. Apparatus according to claim 1 and wherein each of said plurality of fingers defined by said first and second surfaces have formed thereon a pair of spaced, generally raised line portions separated by an interior area, said raised line portions on each of said plurality of fingers defined by at least one of said first and second surfaces defining a plurality of spaced grooves.

9. Apparatus according to claim 2 and wherein each of said plurality of fingers defined by said first and second surfaces have formed thereon a pair of spaced, generally raised line portions separated by an interior area, said raised line portions on each of said plurality of fingers defined by at least one of said first and second surfaces defining a plurality of spaced grooves.

10. Apparatus according to claim 3 and wherein each of said plurality of fingers defined by said first and second surfaces have formed thereon a pair of spaced, generally raised line portions separated by an interior area, said raised line portions on each of said plurality of fingers defined by at least one of said first and second surfaces defining a plurality of spaced grooves.

11. Apparatus according to claim 4 and wherein each of said plurality of fingers defined by said first and second surfaces have formed thereon a pair of spaced, generally raised line portions separated by an interior area, said raised line portions on each of said plurality of fingers defined by at least one of said first and second surfaces defining a plurality of spaced grooves.

12. Apparatus according to claim 5 and wherein each of said plurality of fingers defined by said first and second surfaces have formed thereon a pair of spaced, generally raised line portions separated by an interior area, said raised line portions on each of said plurality of fingers defined by at least one of said first and second surfaces defining a plurality of spaced grooves.

13. Apparatus according to claim 6 and wherein each of said plurality of fingers defined by said first and second surfaces have formed thereon a pair of spaced, generally raised line portions separated by an interior area. said raised line portions on each of said plurality of fingers defined by at least one of said first and second surfaces defining a plurality of spaced grooves.

14. Apparatus according to claim 7 and wherein each of said plurality of fingers defined by said first and second surfaces have formed thereon a pair of spaced, generally raised line portions separated by an interior area, said raised line portions on each of said plurality of fingers defined by at least one of said first and second surfaces defining a plurality of spaced grooves.

15. Apparatus according to claim 8 and wherein said raised line portions on each of said plurality of fingers defined by both of said first and second surfaces define a plurality of spaced grooves, said plurality of grooves of said second surface facing said plurality of grooves of said first surface, said grooves of said second surface being mutually skewed with respect to said grooves of said first surface.

16. Apparatus according to claim 9 and wherein said raised line portions on each of said plurality of fingers defined by both of said first and second surfaces define a plurality of spaced grooves, said plurality of grooves of said second surface facing said plurality of grooves of said first surface, said grooves of said second surface being mutually skewed with respect to said grooves of said first surface.

17. Apparatus according to claim 10 and wherein said raised line portions on each of said plurality of fingers defined by both of said first and second surfaces define a plurality of spaced grooves, said plurality of grooves of said second surface facing said plurality of grooves of said first surface, said grooves of said second surface being mutually skewed with respect to said grooves of said first surface.

18. Apparatus according to claim 11 and wherein said raised line portions on each of said plurality of fingers defined by both of said first and second surfaces define a plurality of spaced grooves, said plurality of grooves of said second surface facing said plurality of grooves of said first surface, said grooves of said second surface being mutually skewed with respect to said grooves of said first surface.

19. Apparatus according to claim 12 and wherein said raised line portions on each of said plurality of fingers defined by both of said first and second surfaces define a plurality of spaced grooves, said plurality of grooves of said second surface facing said plurality of grooves of said first surface, said grooves of said second surface being mutually skewed with respect to said grooves of said first surface.

20. Apparatus according to claim 13 and wherein said raised line portions on each of said plurality of fingers defined by both of said first and second surfaces define a plurality of spaced grooves, said plurality of grooves of said second surface facing said plurality of grooves of said first surface, said grooves of said second surface being mutually skewed with respect to said grooves of said first surface.

21. Apparatus according to claim 14 and wherein said raised line portions on each of said plurality of fingers defined by both of said first and second surfaces define a plurality of spaced grooves, said plurality of grooves of said second surface facing said plurality of grooves of said first surface, said grooves of said second surface being mutually skewed with respect to said grooves of said first surface.

22. Apparatus according to claim 2 and also comprising fluid driven means for providing rotation of a relatively high pressure flow about a longitudinal axis of said stack of filter units at the downstream surface thereof.

* * * * *